(No Model.)
W. B. DOTY.
NUT LOCK.
No. 362,880. Patented May 10, 1887.
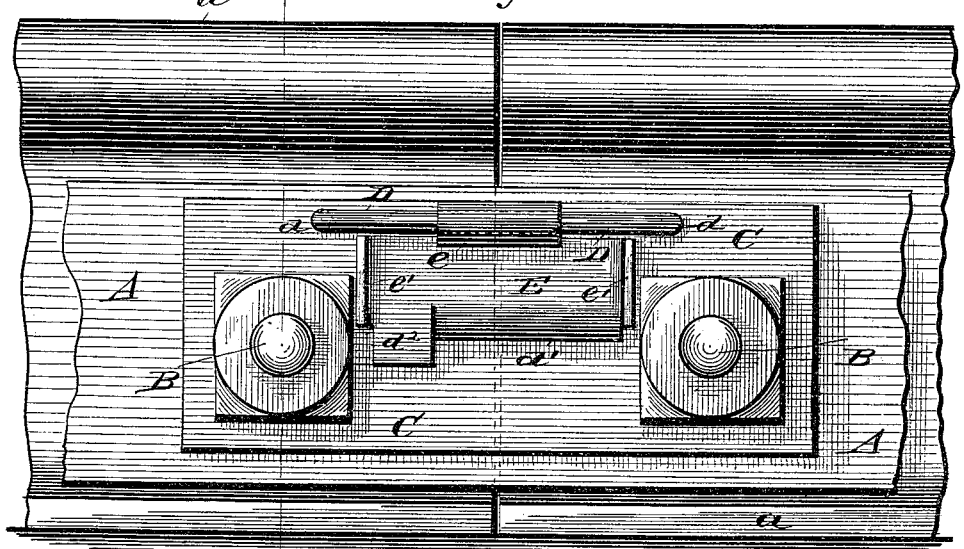
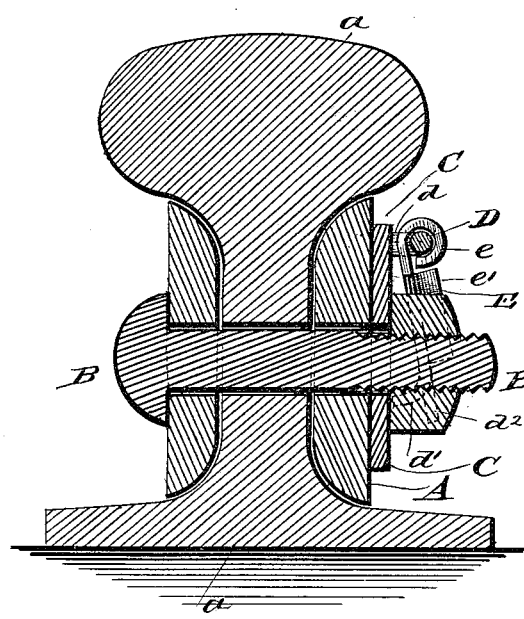
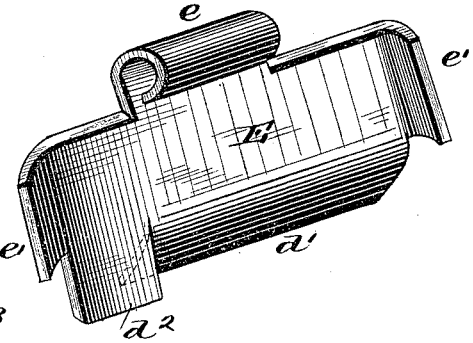
WITNESSES
Phil C. Dietrich
A. E. Sowell
INVENTOR
William B. Doty.
by:
J. S. Alexander
Attorney

UNITED STATES PATENT OFFICE.

WILLIAM B. DOTY, OF CHILLICOTHE, OHIO, ASSIGNOR TO GEORGE STILES AND ALBERT MOORE, BOTH OF SAME PLACE.

NUT-LOCK.

SPECIFICATION forming part of Letters Patent No. 362,880, dated May 10, 1887.

Application filed February 17, 1887. Serial No. 227,936. (No model.)

*To all whom it may concern:*

Be it known that I, WILLIAM B. DOTY, of Chillicothe, in the county of Ross and State of Ohio, have invented certain new and useful Improvements in Nut-Locks; and I do hereby declare that the following is a full, clear, and exact description thereof, reference being had to the accompanying drawings, and to the letters of reference marked thereon, which form part of this specification, in which—

Figure 1 is a side elevation of a portion of railroad-track having my improved nut-lock applied. Fig. 2 is a central vertical cross-section through the same on line $x\ x$. Fig. 3 is a view of a locking-plate detached.

This invention relates to improvements in nut-locking devices, and it is especially designed for use in locking the nuts on the bolts of the fish-plate joints of railroads.

The invention consists in the novel construction and arrangement of parts, as will be fully understood from the following description, taken in connection with the accompanying drawings, and specifically designated in the annexed claim.

Referring to the drawings by letters, A designates a "fish-plate" uniting the adjoining ends of two rails, $a\ a$, by means of suitable bolts, B, and nuts $b$ thereon, in the usual well-known manner.

C designates a plate of thin metal, provided with suitable openings near its ends for the passage of bolts B B, the plate being preferably only long enough to extend between two adjoining bolts, B, and be hinged or placed thereon outside fish-plate A and beneath the nuts $b$, so as to be securely held in position, as shown.

D designates a rod about equal in length to the distance between two adjoining bolts, B B. This rod has its ends $d$ bent at right angles and secured to or near the upper edge of plate C, as shown, so that it forms a guide and hinge for a movable plate, E. This plate E is rectangular in general form and is made of suitable metal, preferably wrought or malleable iron, and is provided at its upper edge with a narrow piece, $e$, which is turned over rod D, as shown, and forms a hinge thereon for plate E, permitting the plate to be turned upon said rod. The length of plate E is such that when down its upturned side edges will impinge against the parallel sides of nuts $b$ of bolts B and prevent the latter from turning. The side edges of plate E may be suitably recessed, if desired, to embrace the various forms of nuts that are used. The lower edge of plate E, when the same is in locking position, is turned inward, as shown, forming a flange, $d'$, which bears against plate C and holds the locking-plate in engagement with the nuts $b$, near the center of width of same, so that should the nuts not have been properly tightened, and consequently the bolts B have an amount of lateral play with the nuts, the latter will not be lifted or shifted outside the edges of plate E, and so be permitted to turn and work off, as would be the case if the plate E lay flush against plate C.

$d^2$ designates a lip or stud formed at the lower edge of plate C by omitting the forming of a portion of flange $d'$. By means of this lip the plate E can be readily lifted or forcibly swung upward free of nuts $b$.

The engaging edges of plate E are turned upward, as shown at $e'$, so that when in position between two nuts, $b$, for locking the same, these upturned edges can be forcibly hammered down, and thereby securely jam and lock the plate against the nuts and prevent its accidentally swinging free of and unlocking the same.

It is obvious that the plate C might in some instances be dispensed with, and the rod D secured directly to the fish-plate A. I prefer, however, making the construction described.

By having the horizontal portion of rod D so much longer than the width of hinge-piece $e$ of plate E the latter, when raised, can be moved on rod D and sufficiently to one side to offer no obstruction to the use of the nut-wrench.

I am aware that laterally-movable hinged locking-plates have been used in nut-locks mounted on a wire forming the washers for two adjoining bolts, and am also aware that plates have been used bent to embrace and engage centrally of the sides or thickness of the nut. Therefore I make no broad claim to such devices; but, Having described my invention, what I claim as new is—

The combination, in a nut-lock, of two adjoining bolts, B, and nuts $b$ thereon, with a plate, C, and longitudinal rod D, secured to the upper edge of said plate, the locking-plate E, hinged to and laterally movable on rod D, and having hinge-piece $e$, flange $d'$, and upturned binding side edges, $e'$, adapted to be flattened, and thereby securely lock the plate against nuts $b\ b$, all constructed and arranged substantially in the manner and for the purpose specified.

In testimony that I claim the foregoing as my own I affix my signature in presence of two witnesses.

WILLIAM $\overset{\text{his}}{\times}$ B. DOTY.
mark.

Witnesses:
R. D. McDougal,
C. B. Foster.